United States Patent
Katz et al.

(10) Patent No.: US 6,256,294 B1
(45) Date of Patent: Jul. 3, 2001

(54) USER SELECTABLE OVERLAP AND ENBLOC DIALING OF ISDN LINE

(75) Inventors: Paul H. Katz, Westlake Village; Michael Kennedy, Ventura, both of CA (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 08/984,284

(22) Filed: Dec. 3, 1997

Related U.S. Application Data

(63) Continuation-in-part of application No. 08/855,117, filed on May 13, 1997.
(51) Int. Cl.[7] .............................. H04M 3/22; H04J 3/12
(52) U.S. Cl. ........................... 370/241; 370/524; 379/21; 379/209
(58) Field of Search ................. 370/241, 250, 370/522, 524; 379/21, 216, 209

(56) References Cited

U.S. PATENT DOCUMENTS

| | | | |
|---|---|---|---|
| 5,303,288 | * 4/1994 | Duffy et al. | 455/564 |
| 5,509,062 | * 4/1996 | Carlsen | 379/210 |
| 5,550,834 | * 8/1996 | D'Ambrogio et al. | 370/385 |
| 5,581,595 | * 12/1996 | Iwashita et al. | 455/31.2 |

* cited by examiner

Primary Examiner—Min Jung
(74) Attorney, Agent, or Firm—Allen, Dyer, Doppelt, Milbrath & Gilchrist, P.A.

(57) ABSTRACT

An ISDN test set employs a user selectable dialing mechanism, that allows the test set user to select from multiple types of dialing—overlap dialing and enbloc dialing, through the use of a simplified functional dialing key set. The dialing key set, in combination with dialing software employed by the test set's supervisory control processor, provides the user with substantial ISDN dialing flexibility, while reducing interaction between the user/craftsperson and the test set, that minimizes dialing inaccuracies that often depend upon the skill and familiarity of the technician with ISDN communications. Enbloc redialing (of the most recently dialed number) or of a stored number in memory is provided only in ON-HOOK mode by the operation of a REDIAL or RECALL key. Otherwise (whenever OFF-HOOK) only overlap mode dialing is employed.

25 Claims, 5 Drawing Sheets

USER SELECTABLE OVERLAP AND ENBLOC DIALING OF ISDN LINE

CROSS-REFERENCE TO RELATED APPLICATIONS

The present application is a continuation-in-part of U.S. patent application Ser. No. 08/855,117, filed May 13, 1997, entitled: "Test Set Using ISDN Bearer Channel for Testing Telephone Line," by R. Soto et al (hereinafter referred to as the '117 application), now abandoned assigned to the assignee of the present application, and the disclosure of which is herein incorporated.

The invention disclosed in the present application also relates to subject matter disclosed in the following U.S. patent applications, each of which is filed coincident with the filing of the present application, is assigned to the assignee of the present application, and the disclosures of which are incorporated herein: Ser. No. 08/984,287, entitled "Testing of ISDN Line via Auxiliary Channel Signaling," by M. Dipperstein et al, (hereinafter referred to as the '287 application); Ser. No. 08/984,515 entitled "Automated Master-Slave Connectivity for Dry Loop ISDN Line," by R. Soto et al, (hereinafter referred to as the '515 application), now abandoned; Ser. No. 08/984,230, entitled "Call Yourself BERT Testing of ISDN Line," by M. Kennedy et al, (hereinafter referred to as the '230 application), now U.S. Pat. No. 5,982,851, issued Nov. 9,1999; and Ser. No. 08/984, 233, entitled "Interactive Contextual-Based Assistance for Portable ISDN Test Set," by P. Katz et al, (hereinafter referred to as the '233 application).

FIELD OF THE INVENTION

The present invention relates to telecommunication systems, and is particularly directed to a user selectable dialing mechanism, that is incorporated within a craftsperson's test set having an architecture of the type described in the above-referenced '117 application, for facilitating the operation of the test set and thereby testing of an ISDN communication circuit.

BACKGROUND OF THE INVENTION

As described in the above-referenced '117 application, a variety of telecommunication test units have been proposed for testing various types of digital signalling circuits. Such circuits may include, but are not limited to, those transporting high-bit-date digital subscriber-line (HDSL) signals, asymmetric digital subscriber line (ADSL) signals, digital data service (DDS) signals and integrated services digital network (ISDN) signals. Unfortunately, such conventional test units are relatively cumbersome and hardware-intensive devices, typically resident in a telcom service office or other fixed system installation, that affords only a single point of access to the circuit of interest.

A non-limiting example of such a conventional test unit is described in the U.S. Pat. No. 5,208,846, to Hammond et al, entitled: "Subscriber Loop Tester for Telephone Switching Systems." In order to be connectable with various types of telecommunication circuits, the Hammond et al test unit contains different types of line interfaces/jacks. Determining which jack is to be used requires that the test system operator have a prior knowledge of the communication link to which the test set is to be coupled. Without this knowledge, the user does not know to which jack the line should be connected, and cannot readily configure the test unit to support a particular user interface and associated termination hardware.

As noted above, conventional test units are relatively large and fixed pieces of equipment, so that they are not readily suited for use in the field (i.e., they are not portable), so that they cannot be readily interfaced with any accessible location along a communication link. This relatively poor facility of transport and ready connection to any location along a link to be tested also limits the practicality and effectiveness of such test units.

These shortcomings have become a particular concern to telecommunication service providers, especially with the continuing expansion and demand for integrated services digital network (ISDN) services. Not only is there currently a need for a practical, portable test set that is capable of testing already installed ISDN circuits, but one which can perform 'dry loop' line testing, prior to its use for ISDN service; namely, there is a need for an ISDN test device that will permit a circuit to be 'prequalified' (as ISDN-capable), before ISDN equipment is purchased and connected to the line to be used for ISDN service.

Advantageously, the portable test set described in the above-referenced '117 application contains a communication architecture that is readily interfaced with virtually any location along a line/circuit to be tested, so as to allow testing of the line, irrespective of its configuration (e.g., two-wire vs. four-wire), or the type of signals that may be conveyed over the line (analog or digital). In addition to circuitry for testing the operation of a standard analog (POTS) line, the portable test set described in the '117 application contains a digital communications controller and associated digital signalling interface circuits, including both 'U' interface and 'S/T' interface circuits.

Thus, the test set can be interfaced with either a two-wire network link or a four-wire customer premises link, and may transmit and receive ISDN bearer channel messages over whatever line to which it is connected. The contents of such bearer channel messages may be defined to evoke prescribed responses from a companion test set coupled to another portion (relatively far end) of the communication circuit of interest, so that the line linking the two test sets may be tested. When two such test sets are interfaced with spaced apart locations of the circuit/line under test, they may operate in respective master and slave modes, allowing a craftsperson using the master test set to initiate a bit error rate test (BERT) from one end of the circuit, and derive a measure of the operational performance characteristic of the in-between segment of the circuit.

SUMMARY OF THE INVENTION

The present invention is directed to an enhancement of the ISDN communication and testing capability of the test set described in the '117 application, that allows the test set user to readily select either overlap mode dialing or enbloc mode dialing, through the use of a simplified functional dialing key set. Enbloc speed redialing of the most recently dialed number is provided only in ON-HOOK mode by the operation of the REDIAL or RECALL function keys. Otherwise (whenever OFF-HOOK) only overlap mode dialing is employed. This provides the user with substantial ISDN dialing flexibility, while reducing interaction between the user/craftsperson and the test set, that minimizes dialing inaccuracies that often depend upon the skill and familiarity of the technician with ISDN communications.

As in the case of a conventional POTS telephone, overlap or sequential DTMF dialing involves the transmission of the individual digits of a dialed telephone number—one digit at the time. In a standard analog POTS dialing scheme, using dual tone multifrequency (DTMF) signaling, as the digits of a called number are keyed-in, DTMF tones associated with the dialed digits are transmitted in sequence, with a digit (tone) on period followed by a quiescent or off period between digits. This tone-on, tone-off sequencing allows the network switching equipment to distinguish between respective tones of a dialed number sequence.

For ISDN signalling, however, instead of being transmitted as in band tones, the digits are transmitted as a sequence of digital (bearer channel) messages, each of which is associated with a respectively dialed number. To initiate the overlap mode of dialing, the user first takes the test set OFF-HOOK by operation of an OFF-HOOK key on the test set keypad. (Whenever the test set is OFF-HOOK, enbloc dialing is blocked.)

Assertion of the OFF-HOOK key causes the dialing routine to transmit an overlap dialing mode call set-up message over the D channel to the public switched telephone network (PSTN). In response to an overlap mode call set-up message (which contains no dialed digit information as does an enbloc call set-up message, to be described), the network switch sends back a call set-up acknowledgement message, and waits for the digits to be sequentially transmitted from the test set, in the form of a cascaded sequence of D channel information messages, each containing the identification of a respective digit.

Since an ISDN call set-up message is a data message, the network switch will not normally return an in-band dial tone signal that would be played back to the user via the test set's speaker. To provide dial tone for the benefit of a POTS-familiar craftsperson, when the call set-up acknowledgement message from the switch is received (and in the expected absence of in-band dial tone signaling) from the network, the overlap dialing routine causes a POTS-type dial tone to be audibly generated via the test set receiver/speaker.

Upon hearing dial tone, the craftsperson knows that he can begin keying in (dialing) the called telephone number. Dialing of numbers can be conducted in one of two ways: 1) memory access speed dialing, where the number is accessed from memory in accordance with a speed dialing format, to be described, or 2) key dialing, where each digit of the dialed number is generated in accordance with user operation of a respective key on the test set keypad. If memory access speed dialing is to employed, the craftsperson operates a RECALL key, which invokes a RECALL subroutine.

When the RECALL subroutine is called up, a list of previously stored numbers is displayed to the craftsperson via the test set's LCD display. The craftsperson then uses the keypad to select the number to be dialed. In response to the selection, requested number is read out of memory so that it may be transmitted to the network. The stored number entries that are accessible from the RECALL subroutine may be any combinations of digits associated with the operation of the test set, including prescribed default entries and those selectively entered by the user, such as, but not limited to, one or more passwords associated with specified pieces of test equipment, voice mail, etc. that may be called.

As respective digits are generated, either directly keyed in by the craftsperson, or through the use of the RECALL speed dialing routine, respective call set-up information (INFO) messages representative of the digits are assembled and transmitted over the D channel to the network. These info messages are sequentially transmitted to the network switch, until the requisite number of digits has been transmitted (e.g., seven digits for a local call, ten digits plus a precursor '1' for a long distance call).

In addition to transmitting a D channel INFO message in association with each dialed digit, the overlap dialing routine also transmits a redundant DTMF tone over a bearer channel to the network. This not only enables the craftsperson to audibly confirm transmission of the digits for dialing the call, but also allows another piece of test equipment that may be already connected to the line to detect the tones and be controlled by those tones.

Once the network has received the requisite number of digits and begins processing the call, it transmits a call processing message. In response to the call proceeding message from the network, the overlap dialing routine generates a ringing signal, to simulate a 'far end' ringing signal that the craftsperson would expect to hear for the placement of a POTS call. Further processing of the call will be governed by the return of messages from the called party, such as another test set.

As pointed out above, in contrast to overlap dialing, wherein the dialed digits are transmitted sequentially in the form of respective INFO messages (and accompanying redundant DTMF tones), for enbloc dialing, the entire dialed telephone number is formatted and transmitted as a 'piggy-back' set-up message. A major benefit of enbloc dialing is that it minimizes errors and speeds up the connection. In order to use the enbloc dialing feature of the invention, the craftsperson invokes the REDIAL or RECALL keys on the test set keypad, without going OFF-HOOK.

In response to the craftsperson operating the REDIAL or RECALL keys, while the test set is in the OFF-HOOK mode, an enbloc set-up message is transmitted immediately to the network. For this purpose, the enbloc dialing routine (invoked by the use of the REDIAL or RECALL keys) puts the test set in an OFF-HOOK state, and causes the assembly of a speed dial set-up message for transmission over the control (D) channel to the network. This speed dial set up message includes all of the digits of the most recently dialed telephone number, which are accessed from a portion of memory employed as a speed dial data buffer, and then assembled as part of the call set-up message following the call set-up precursor information within the D channel message.

Upon receiving the speed dial set-up message, the network sends back a set-up acknowledgement message to the test set. The enbloc dialing routine then proceeds in a similar manner as described above for overlap mode dialing, except that a far end ringing signal is simulated, to inform the craftsperson that the call set-up message containing all of the digits of the called number has been successfully placed. When the call is answered, the simulated ringing signal is terminated. The craftsperson now knows that the speed dial message has been answered and he can perform further call placement activity, as necessary, such as using the RECALL key or directly key-in further numbers, for example, the contents of a password, for controlling access and/or operation of the called piece of equipment, such as, but not limited to a direct access test unit (DATU) or remote test unit (RTU).

Since the test set has been placed in the OFF-HOOK mode by the enbloc routine, any additional dialing is effected in accordance with OVERLAP format, as described above, so that as digits are either directly keyed-in by the craftsperson, or generated through the use of the RECALL routine, the dialing sequence generates respective info messages representative of the dialed digits and transmits these info messages over the D channel to the network, as described above. Also, since OVERLAP dialing is being used, the routine transmits redundant DTMF tones over a bearer channel to the network, in addition to transmitting a D channel INFO message, for each digit. As noted above, this auxiliary bearer channel tone signalling not only allows the craftsperson to audibly confirm operation of each key being used to dial the call, but also enables another device already connected to the line to hear the tones and be controlled by those tones.

DETAILED DESCRIPTION

Figure 1:
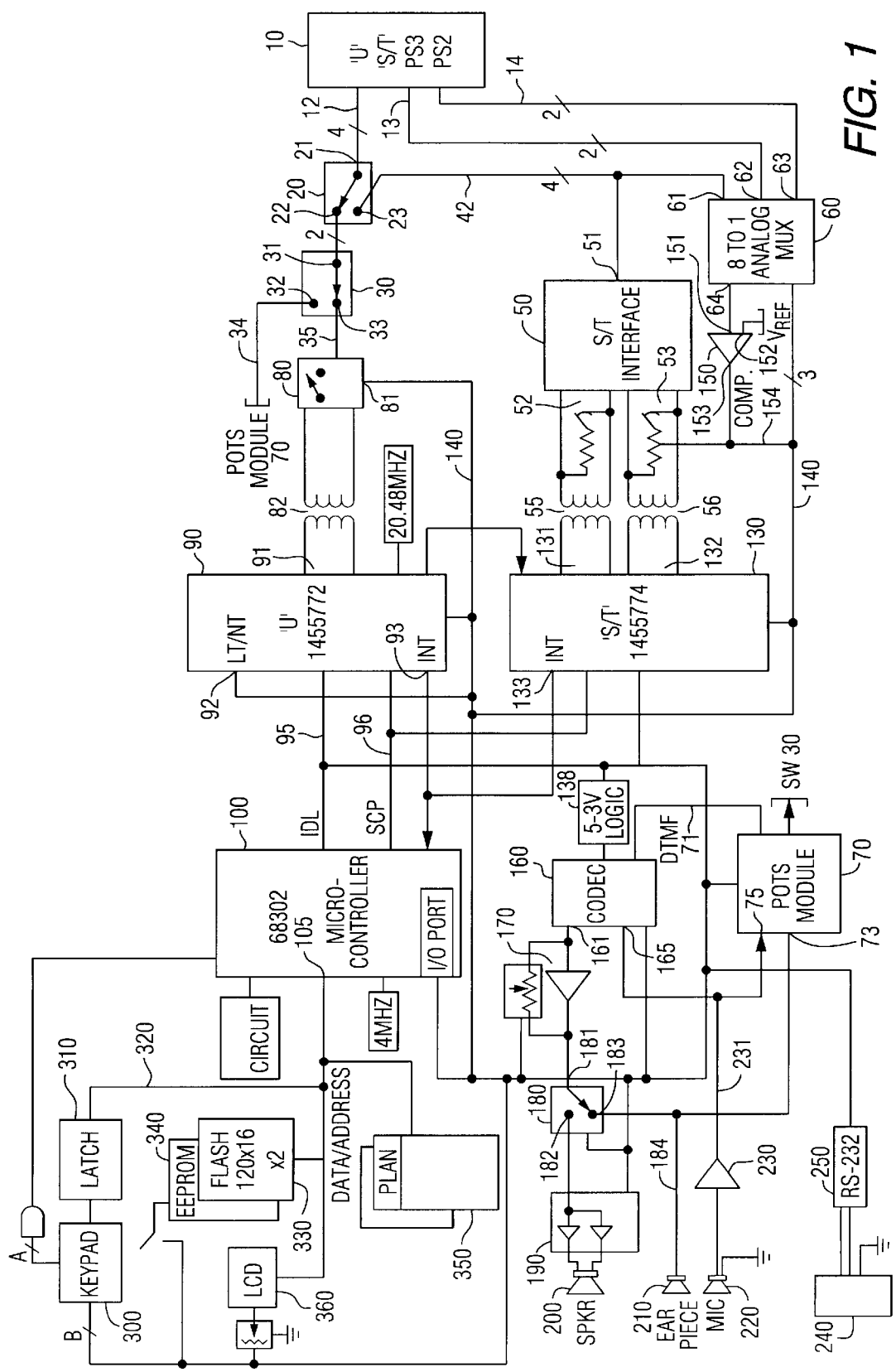
FIG. 1 diagrammatically illustrates the architecture of the ISDN test set architecture described in the '117 application.

Before describing in detail the new and improved dialing mechanism of the present invention, it should be observed that the invention resides primarily in what is effectively an augmentation of the operational control software executed by the supervisory microcontroller of the test set of the '117 application. The circuitry of the test set is otherwise essentially unaffected. Consequently, the architecture of the test set per se, and the manner in which it is interfaced with communication equipment of a telephone network have been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations of the Figures are primarily intended to illustrate the major components of the system in a convenient functional grouping, whereby the present invention may be more readily understood.

Figure 2:
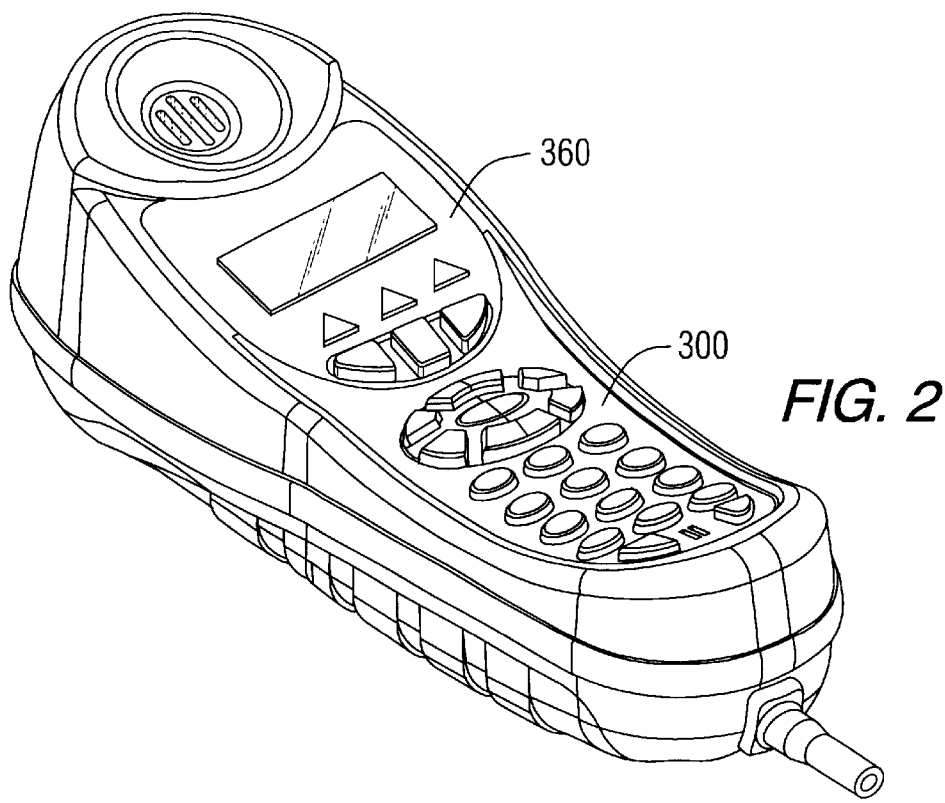
FIGS. 2 and 3 are respective front and rear isometric pictorial views of a housing configuration for the ISDN test set of FIG. 1.
Figure 3:
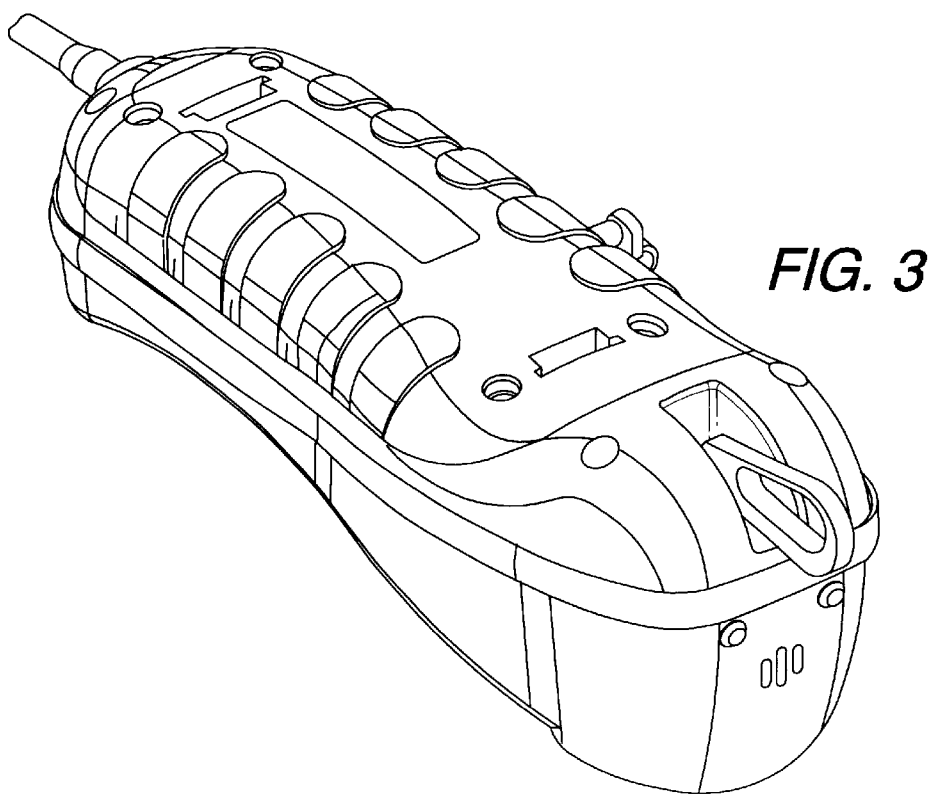

The overall communication and signal processing circuit architecture of a test set of the type described in the '117 application, in which the communication and testing control mechanism of the present invention may be readily incorporated, is diagrammatically illustrated in FIG. 1. To facilitate portability and ruggedized field use, the test set's circuit architecture is preferably housed within a robust protective casing physically configured as diagrammatically illustrated in the isometric pictorial views of FIGS. 2 and 3, and disclosed in detail in the following co-pending U.S. Patent applications: Design Ser. No. 29/061,617, entitled: "ISDN Test Set," by R. Soto et al, filed Oct. 28, 1996, which is a continuation-in-part of U.S. Design Ser. No. 29/053,246, entitled: "ISDN Test Set," by R. Soto et al, filed Apr. 18, 1996; and Utility Applications: Ser. No. 08/754,077, filed Nov. 20, 1996, entitled "Telephone Test Set Keypad with Integrated Dynamic Microphone," by E. Zoiss et al; Ser. No. 08/753,101, filed Nov. 20, 1996, entitled "Telephone Test Set LCD Panel Carrier," by E. Zoiss et al; Ser. No. 08/754, 075, filed Nov. 20, 1996, entitled "Line Cord Strain Relief Attachment for Telephone Test Set," by E. Zoiss et al; and Ser. No. 08/754,076, filed Nov. 20, 1996, entitled "Variable Geometry Battery Compartment for Accommodating Different Sized Batteries in Telephone Craftsperson's Test Set," by E. Zoiss et al. Each of the above applications is assigned to the assignee of the present application, and their disclosures are herein incorporated.

Referring now to FIG. 1, the communication and signal processing circuit architecture of the test set described in the '117 application, is diagrammatically illustrated as comprising a multi-pin modular jack 10, engagable by a multi-pin conductor plug terminating one end of a multi-conductor line cord, through which the test set is connectable with a circuit under test. The respective pins of the modular jack 10 are connected via multi-conductor links 12, 13 and 14, to the internal circuitry of the test set.

For this purpose, a first four-pin link 11, two leads of which are respectively associated with tip and ring lead conductors of multi-pin jack 10, is coupled to a four-pin common port 21 of a first switch 20. A first, two-pin switch port 22 of switch 20 is coupled to a two-pin common port 31 of a second switch 30. A second, four-pin switch port 23 of first switch 20 is coupled to a four conductor link 42 to a four-pin port 51 of a transformer interface 50 and to a four pin input port 61 of an 8:1 analog multiplexer 60. Two-pin links 13 and 14 are coupled from modular jack 10 to respective two pin in ports 62 and 63 of 8:1 analog multiplexer 60.

The 8:1 analog multiplexer 60 has an output port 64 coupled to a first input 151 of a voltage threshold comparator 150. Voltage threshold comparator has a second input 152 coupled to receive a prescribed reference voltage $V_{REF}$. The output 153 of comparator is coupled to an input/output (I/O)—control bus 140 associated with the test set's supervisory microcontroller 100. The multiplexer 60 has a multi-bit steering control input 65 coupled to control bus 140, for selecting which of the respective portions of multiconductor links 42, 13 and 14 is coupled to comparator 150. Should the line voltage of the selected lead exceed the threshold reference voltage $V_{REF}$, the voltage comparator 150 provides an output on a voltage detect line portion 154 of the I/O control bus 140, which is read by the micro-controller 100. The states of the respective sets of leads 12–14 are mapped by an internal truth table used by the microcontroller 100 to identify the type of line to which the test set is connected.

A first, two pin port 32 of the switch 30 is coupled via link 34 to a POTS line interface module 70. Module 70 module contains conventional dial tone detector and DTMF signalling circuitry, and is employed for conducting voice communications, DTMF and dial pulse signalling on a POTS line. A second two pin switch port 33 of switch 30 is coupled via link 35 to a controlled attenuator 80. Attenuator 80 has a control port 81 coupled to the control bus 140, and is transformer-coupled, by way of transformer circuit 82, to a two wire port 91 of standard (two wire) 'U' interface chip 90, used for standard 2B1Q signalling.

The 'U' interface chip 90, which is coupled to and controlled by microcontroller 100, is selectively controlled via a control port 92 to function as either a line termination (LT) or a network termination (NT). As will be described, when either bit error rate testing (BERT) of the line, or dry-loop communications are to be carried out over the line under test, the 'U' interface chip 90 is selectively placed in LT mode. A port 93 provides an interrupt link to the microcontroller 100. Digital data communications between the two-wire 'U' interface chip 90 and the microcontroller 100 are effected by way of a first (IDL) digital serial bus digital 95 and a second (SCP) digital serial bus 96.

The four-wire transformer interface 50, to the four pin port 51 of which the four lead conductor link 42 is coupled from port 23 of switch 20, has respective pairs of two wire links 52 and 53 transformer-coupled, via transformer pairs 55 and 56, to respective two wire ports 131 and 132 of a (four wire) 'S/T' interface chip 130. Respective controlled attenuators 57 and 58 are coupled across links 52 and 53, and are controlled by way of control bus 140. Like the 'U' interface chip 90, the 'S/T' interface chip 130 is coupled to microcontroller 100 by way of the first digital link IDL 95 and the second digital link SCP 96. In addition, it has an interrupt port 133 for providing an interrupt signal to the microcontroller 100.

The first (IDL) digital serial bus 95 is further coupled through a (5V–3V) logic level translation circuit 138 to a CODEC 160. CODEC 160 is coupled via a DTMF link 71 to POTS line interface module 70. The CODEC 160 has a first output port 161 coupled through a controlled gain amplifier 170 to a common/input terminal 181 of a switch 180. Switch 180 has a first output terminal 182 coupled to a speaker amplifier 190, the output of which is coupled to an audio speaker 200. Switch 180 has a second output terminal 183 coupled to link 184 which is coupled to of POTS line interface module 70. Link 184 is further coupled to an earpiece receiver transducer 210 of the test set. A microphone (MIC) 220 is coupled to an amplifier 230, the output of which is coupled via link 231 to port 165 of CODEC 160 and to an audio input port 75 of POTS line interface module 70.

An auxiliary digital (RS 232) I/O port is provided by way of a multipin connector 240, such as an RJ-45 jack. This connector is coupled to an RS-232 transceiver 250, which may be used to monitor externally provided bearer (B) channel information or to download communication control software into the microcontroller 100. The RS-232 transceiver 250 is, in turn, ported to I/O-control bus 140.

User/craftsperson inputs for controlling operation of the test set are effected by means of a standard multi-key keypad 300, to which I/O-control bus 140 is coupled. Key depression of the keys of the keypad 300 generate input commands that are buffered in a latch 310, the contents of which are asserted onto a distributed multibit data/address bus 320. Data/address bus 320 is ported to a data/address port 105 of the microcontroller 100. Microcontroller 100 has a limited storage capacity flash memory 330, an EPROM 340 in which the operational software for the microcontroller is stored, and a random access memory 350 for storing data processed by the microcontroller's central processing unit (CPU).

The data/address bus 320 is also ported to an LCD unit 360, which provides an alpha-numeric visual display of a menu of options/actions that may be selectively invoked by keypad inputs from the user, and an indication of the operation of the test set, as microcontroller 100 sequences through stored test routines, to be described. In addition to the LCD unit 360, the test set may employ one or more discrete visual indicators, such as a set of LEDs that are coupled to I/O bus 140, and selectively individually energized by the microcontroller 100 to provide an indication of prescribed status or operational conditions of the line under test such as, but not limited to, ON/OFF hook, ON/OFF sync, tip/ring polarity and test set battery charging status.

As described in the above-referenced '117 application, the test set architecture of FIG. 1 is able to conduct a number of analog and digital test operations of a line to it is connected. These test operations include an initial "LINE IDENTIFICATION" mode (in which the type of line to which the test set is connected is automatically determined), and "POTS" mode (for testing a POTS line, in which the tip and ring line portions of the four-wire link 12 are coupled through switches 20 and 30 to the POTS line interface module 70).

In addition, because the test set architecture of FIG. 1 includes both two-wire 'U' interface chip 90 and four-wire 'S/T' interface chip 130, the test set may be used to troubleshoot a potentially faulty digital (e.g., ISDN) circuit that is either upstream (toward the central office), or downstream (toward a remote terminal—customer premises equipment) of the location at which the craftsperson has connected the test set. Where two test sets of the type shown in FIG. 1 are available, the potentially faulty circuit of interest may be tested by placing the test sets in a master-slave mode of operation. The 'master' test set may be connected to a first, test supervisory location of the line, from which the test is to be conducted (such as at a central office line termination location). The 'slave' test set may be connected to a second site of the line, geographically remote from the first site (such as at a network termination of a customer premises). Once a loopback path has been established between two test sets, a BERT test may be initiated from either the master or slave test set.

In addition to loopback (for bit error rate testing), an echo-back mode of operation may also be used. This mode is somewhat similar to the loopback mode in that it's purpose is to have the slave test set send back to the master test set the contents of a prescribed data sequence. In echo-back mode, however, rather than the slave test set simply operating as a passive loopback device, the slave test set captures and then retransmits data placed on the D channel by the master test set.

Figure 4:
FIG. 4 diagrammatically illustrates a public switched telephone network at opposite ends of which respective master and slave ISDN test sets may be connected.
Figure 5:
FIG. 5 diagrammatically illustrates a dry loop ISDN circuit having opposite ends connected to respective master and slave ISDN test sets.

A voice link may be also established either over a public switched network, as diagrammatically illustrated in FIG. 4, or between two test sets that are connected to opposite ends of a non-powered or 'dry loop' link, as diagrammatically illustrated in FIG. 5, with one of the test sets operating in LT mode as a line termination device, and the other operating in NT mode as a network termination device. Also described in the '117 application is a callback mode of operation, which allows an unmanned slave test set to return a voice call (i.e., without the participation of an attendant craftsperson), and thereby determine whether a voice call can be established over the circuit under test.

As described above, the present invention is directed as an enhancement to the dialing control software executed by the test set's supervisory processor 100, for facilitating communication and testing functionality of the test set, including the operations described in the '117 application, reviewed briefly above. Pursuant to the invention, two types of dialing are available to the test set user: 1) overlap dialing; and 2) enbloc dialing.

OVERLAP DIALING (FIG. 6)

As described briefly above, in a conventional analog POTS telephone network, overlap or sequential DTMF dialing involves the dialing of a desired telephone number—one digit at the time, with pauses between digits. As the (DTMF) tones associated with the dialed digits are generated, they are transmitted in sequence, with a digit (tone) on period followed by a quiescent or off period between digits. This alternating tone-on, tone-off sequencing allows the switching equipment to distinguish between the respective digits of a dialed sequence.

For ISDN signalling, no tones are transmitted. Instead, the digits are transmitted as a sequence of bearer channel messages, each of which is associated with a respectively dialed number. As overlap dialing is the only type of dialing that is permitted when the test set is off-hook, and enbloc dialing (to be described below with reference to FIG. 9) is executable only if the test set is on-hook, the first step in each routine is to determine the state of the test set (i.e., whether the test set is in ON-HOOK or OFF-HOOK mode).

Figure 6:
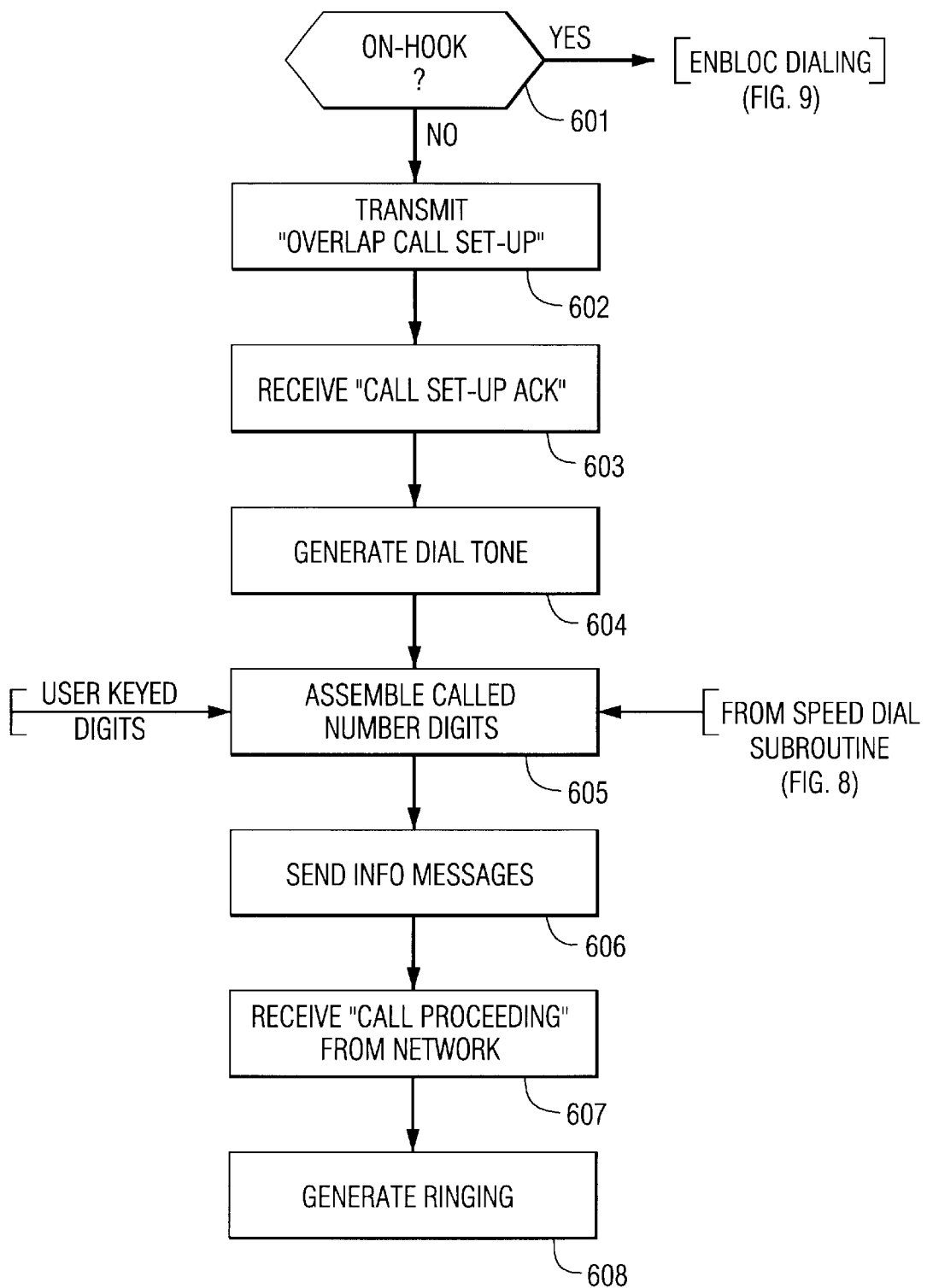
FIG. 6 is a flow chart showing the steps of ISDN overlap dialing in accordance with the present invention.

This initial determination is shown at (ON-HOOK ?) query step 601 in the flow chart of FIG. 6. For the purposes of providing a non-limiting example, it will be assumed that the craftsperson has operated the HOOK key, so that the answer to step 601 is NO, in response to which, in step 602, the overlap dialing routine causes the transmission of an "OVERLAP CALL SET-UP" message over the control (D) channel to the public switched telephone network (PSTN). If the answer to step 601 is YES, the dialing routine infers enbloc dialing, to be described below with reference to the flow chart of FIG. 9.

Upon receiving the CALL SET-UP message, the network examines the contents of the message to determine whether it also contains the digits of the number being called (as would be the case for an en-bloc call set-up message). Since an OVERLAP call set-up message does not contain the digits of the called number, there are no digits to process, and the network returns a "CALL SET-UP ACKNOWLEDGEMENT" message, which is received at the calling test unit in step 603, and waits for the digits to be sequentially dialed (in the form of a cascaded sequence of D channel information messages, each containing the identification of a respective digit).

Moreover, because an ISDN call set-up message is a data message, as opposed to a POTS type of message, the network will not normally return an in-band dial tone signal that could otherwise be played back to the user via the test set's codec. Consequently, for the benefit of a POTS-familiar craftsperson, in response to receipt of the CALL SET-UP ACKNOWLEDGEMENT message (and an associated absence of in-band dial tone signaling from the network), in step 604, the calling test set's supervisory control processor causes a POTS-type dial tone to be audibly generated via the test set receiver/speaker.

Figure 7:
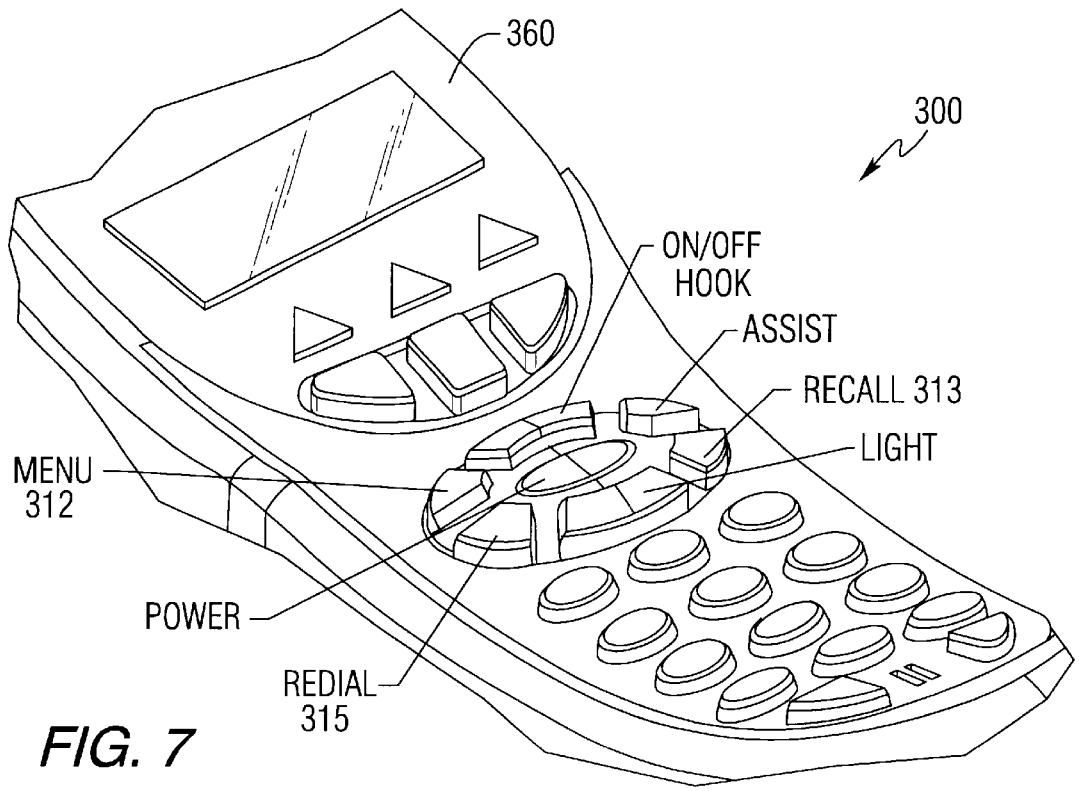
FIG. 7 is a pictorial illustration of a test set keypad.
Figure 8:
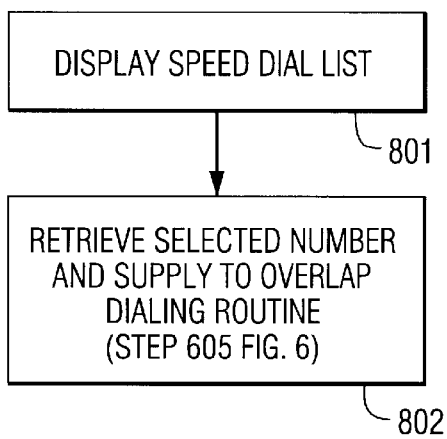
FIG. 8 is a flow chart showing the steps of a RECALL subroutine used for OVERLAP mode dialing.

Upon hearing dial tone, the craftsperson knows that he can begin keying in (dialing) the called telephone number. Dialing of numbers can be conducted in one of two ways: 1) speed dialing, where the number is accessed from memory in accordance with a speed dialing format, to be described, or 2) key dialing, where each digit of the dialed number is generated in accordance with user operation of a respective key on the test set keypad. If speed dialing is to employed, the craftsperson operates the RECALL or REDIAL key, shown at 313 or 315 in the pictorial test set keypad illustration of FIG. 7. Whenever the RECALL key 313 is operated, a RECALL subroutine shown in FIG. 8 is executed.

RECALL SUBROUTINE (FIG. 8)

Specifically, in step 801 of the RECALL subroutine, a list of previously stored numbers is displayed to the craftsperson via the test set's LCD display 360. The craftsperson then uses the keypad 300 to select the number to be dialed. In response to the user's selection, in step 802, the RECALL subroutine accesses the requested number and provides the selected number to digit assembly step 605 in the dialing routine of FIG. 6, so that the selected number may be transmitted to the network. The stored number entries that are accessible from the RECALL subroutine of FIG. 8 may be any combinations of digits associated with the operation of the test set, including prescribed default entries and those selectively entered by the user, such as, but not limited to, one or more passwords associated with specified pieces of test equipment, voice mail, etc. that may be called.

As respective digits are generated, either directly keyed in by the craftsperson dialing the called number, or through the use of the RECALL routine, in step 606 the dialing sequence generates associated call set-up "INFO" messages representative of the dialed digits and transmits these INFO messages over the D channel to the network. Respective INFO messages are sequentially transmitted until the requisite number of digits has been transmitted (e.g., seven digits for a local call, ten digits plus a precursor '1' for a long distance call). Where the dialed numbers are keyed in by the user, continued operation of keys in addition to those necessary for calling the number are ignored by the network.

Once the network has received the requisite number of digits and begins processing the call, it transmits a "CALL PROCEEDING" message, which is received by the test set in step 607. In response to the CALL PROCEEDING message from the network, the overlap dialing routine generates a ringing signal in step 608, so as to simulate a 'far end' ringing signal that the craftsperson would expect to hear in the placement of a POTS call. Further processing of the call will be governed by the return of messages from the called party, such as another test set.

Pursuant to a further feature of the OVERLAP dialing scheme of the invention, in addition to transmitting a D channel INFO message in association with each dialed number, the routine also transmits a redundant DTMF tone over the (default or user-selected) bearer (e.g., B1) channel to the network. This not only allows the craftsperson to audibly confirm transmission of the numbers being used to dial the call, but also allows another piece of test equipment that may be already connected to the line to detect the tones and be controlled by those tones.

ENBLOC DIALING (FIG. 9)

In contrast to overlap dialing, wherein each digit is transmitted sequentially in the form of a respective INFO message (and an accompanying DTMF tone), for enbloc dialing, the entire dialed telephone number is formatted and transmitted as a 'piggy-back' (set-up) message, rather than a sequence of messages. An obvious advantage to this approach is the fact that, by reducing errors and speeding up the connection, it enables the user to immediately determine whether the line will support ISDN signalling, and thereby minimizes ISDN service charges, which commence with an OFF-HOOK condition, rather than a successful connection to a called party as in the case of a POTS call. In addition, for the benefit of the craftsperson, a series of tones is audibly generated via the test set speaker.

An enbloc set-up message is transmitted immediately in response to the craftsperson operating the REDIAL or RECALL key (shown at 315 or 313 in FIG. 7), as long as the test set is in the OFF-HOOK mode. Namely, not only is it not necessary for the craftsperson to go off-hook, but the ENBLOC mode will not operate if the HOOK key has been operated, as in OVERLAP mode, described above. Namely, an enbloc piggy-back message is transmitted only in response to the craftsperson operating the REDIAL or RECALL key, while the test set is on-hook. If the test set is off-hook, only overlap dialing (described above) can be employed.

Figure 9:
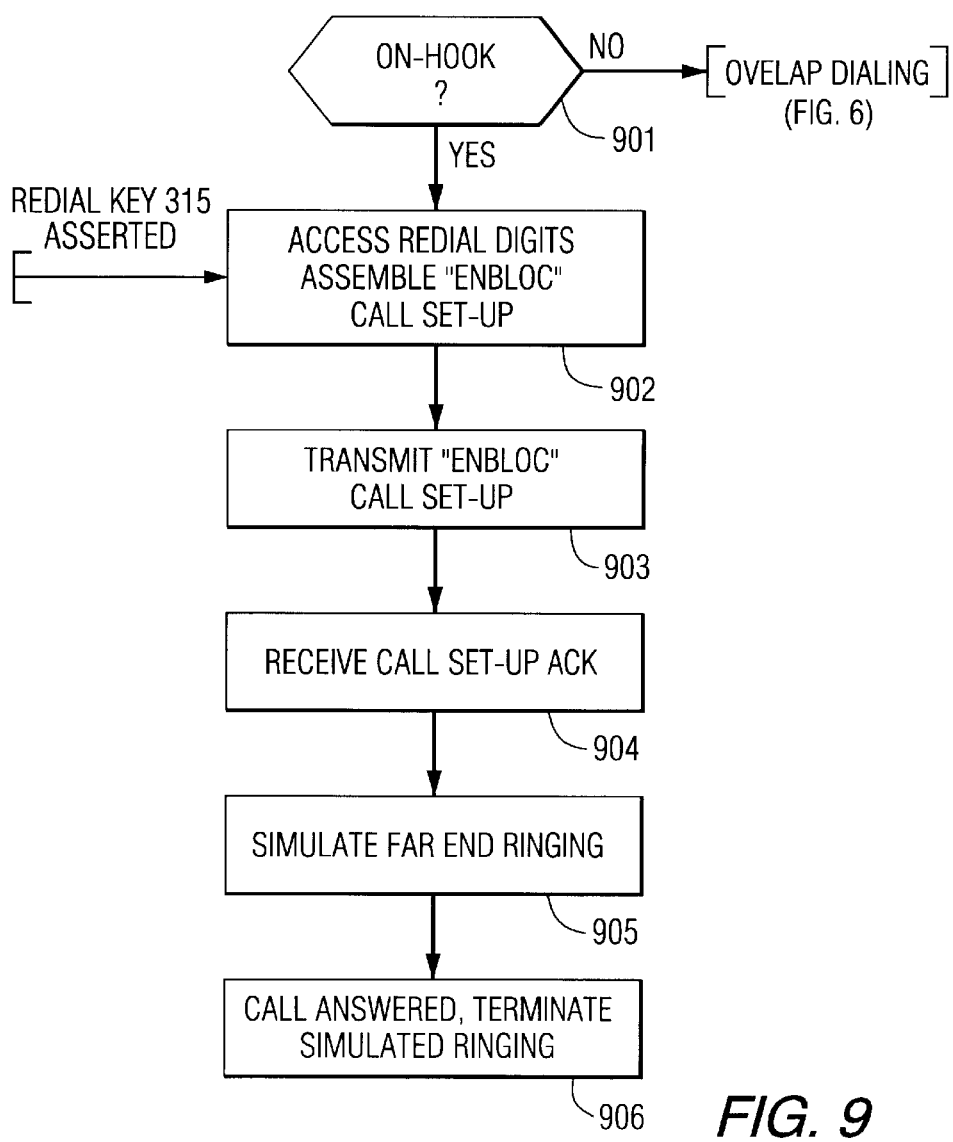
FIG. 9 is a flow chart showing the steps of ISDN enbloc dialing in accordance with the present invention.

More particularly, as in the initial query step 601 of the overlap dialing flow chart of FIG. 6, the first step of the enbloc speed dialing routine of FIG. 9, shown at step 901, is to determine the state of the test set (i.e., whether the test set is ON-HOOK or OFF-HOOK). In the present example, it is assumed that the craftsperson has not operated the HOOK key, and that the test set is currently ON-HOOK. In this state, in response to the operation of the REDIAL key 315 or RECALL key 313, in step 902, the enbloc dialing routine puts the test set in an OFF-HOOK state, and causes the assembly of an "ENBLOC SET-UP" message that is to be transmitted over the control (D) channel to the network. This ENBLOC set-up message contains all of the digits of the most recently dialed telephone number or the number stored in memory which corresponds to the user entered speed dial entry, which are accessed from a portion of memory employed as a speed dial data buffer, and then assembled as part of the call set-up message following the call set-up precursor information within the D channel message. At step 903, the ENBLOC SET-UP message is transmitted over the D channel to the network.

Upon receiving the speed dial set-up message, the network sends back a "SET-UP ACKNOWLEDGEMENT" message, which is received at the calling test unit in step 904. The enbloc dialing routine then proceeds in a similar manner as described above for overlap mode dialing, except that a far end ringing signal is simulated in step 905, to inform the craftsperson that the call set-up message (which contains all of the digits of the called number) has been successfully placed.

When the call is answered, the simulated ringing signal is terminated, in step 906. The craftsperson now knows that the speed dial message has been answered and he can perform further call placement activity, as necessary, such as using the RECALL or REDIAL key or directly key-in further numbers, for example, the contents of a password, for controlling access and/or operation of the called piece of equipment, such as, but not limited to a direct access test unit (DATU) or remote test unit (RTU).

Since the test set is currently OFF-HOOK, such additional dialing is effected in accordance with OVERLAP format, described above, so that as digits are either directly keyed-in by the craftsperson, or generated through the use of the RECALL routine, the dialing sequence generates INFO messages representative of the dialed digits and transmits these INFO messages over the D channel to the network, as described above. Also, since OVERLAP dialing is being used, the routine transmits a redundant DTMF tone over the (default or user-selected) bearer (e.g., B1) channel to the network, in addition to transmitting a D channel INFO message, for each digit. As noted above, this auxiliary bearer channel tone signalling not only allows the craftsperson to audibly confirm operation of each key being used to dial the call, but also enables another device already connected to the line to hear the tones and be controlled by those tones.

As will be appreciated from the foregoing description, by providing a telecommunications craftsperson with the ability to readily select from multiple types of dialing—overlap dialing and enbloc dialing—through the use of a simplified functional dialing key set, not only does the ISDN dialing mechanism of the present invention offer substantial ISDN dialing flexibility, but does so in a manner that reduces interaction between the user/craftsperson and the test set, and thus improves performance by minimizing dialing inaccuracies that often depend upon the skill and familiarity of the technician with ISDN communications. While we have shown and described an embodiment in accordance with the present invention, it is to be understood that the same is not limited thereto but is susceptible to numerous changes and modifications as known to a person skilled in the art, and we therefore do not wish to be limited to the details shown and described herein, but intend to cover all such changes and modifications as are obvious to one of ordinary skill in the art.

What is claimed is:

1. A method of placing a call from an integrated services digital network (ISDN) telecommunications device over a communication circuit comprising the steps of:
   (a) providing said ISDN telecommunications device with a dialing mechanism that includes overlap mode ISDN dialing and enbloc mode ISDN dialing; and
   (b) causing said ISDN telecommunications device to place a call over said communication circuit in accordance with said dialing mechanism provided in step (a); and wherein
   said overlap mode ISDN dialing of said dialing mechanism provided in step (a) is operative, when executed in step (b), to transmit an overlap mode call set-up message that causes a network communications device coupled to said communication circuit to send back a call set-up acknowledgement message, and is thereafter operative to transmit a cascaded sequence of D channel information messages, each containing the identification of a respective digit of a called number.

2. A method according to claim 1, wherein said overlap mode ISDN dialing of said dialing mechanism provided in step (a) is further operative, when executed in step (b), to generate an audible dial tone in response to said set-up acknowledgement message.

3. A method according to claim 1, wherein said overlap mode ISDN dialing of said dialing mechanism provided in step (a) is further operative to store respective digits of a called number and, when executed in step (b), to transmit said cascaded sequence of D channel information messages identifying said respective digits of said called number as stored in step (a).

4. A method according to claim 1, wherein said overlap mode ISDN dialing of said dialing mechanism provided in step (a) is further operative, when executed in step (b), to transmit said cascaded sequence of D channel information messages identifying said respective digits of a called number as keyed in by a user of said telecommunications device.

5. A method according to claim 1, wherein said overlap mode ISDN dialing of said dialing mechanism provided in step (a) is operative, when executed in step (b), to transmit a sequence of DTMF tones respectively associated with said cascaded sequence of D channel information messages identifying digits of said called number.

6. A method according to claim 1, wherein said overlap mode ISDN dialing of said dialing mechanism provided in step (a) is further operative to store respective digits of a called number and, when executed in step (b), to transmit said cascaded sequence of D channel information messages identifying respective digits of a selected one of said called number as stored in step (a), and another called number as keyed in by a user of said telecommunications device.

7. A method according to claim 1, wherein said overlap mode ISDN dialing of said dialing mechanism provided in step (a) is further operative, when executed in step (b), to simulate a far end ringing signal, in response to receiving a message from said network communications device indicating that it has received said cascaded sequence of D channel information messages identifying respective digits of said called number.

8. A method of placing a call from an integrated services digital network (ISDN) telecommunications device over a communication circuit comprising the steps of:

(a) providing said ISDN telecommunications device with a dialing mechanism that includes overlap mode ISDN dialing and enbloc mode ISDN dialing; and (b) causing said ISDN telecommunications device to place a call over said communication circuit in accordance with said dialing mechanism provided in step (a); and wherein said enbloc mode ISDN dialing of said dialing mechanism provided in step (a) is operative, when executed in step (b), to transmit an enbloc mode call set-up message containing identifications of all of the digits of a called number; and wherein said enbloc mode ISDN dialing of said dialing mechanism provided in step (a) is further operative, when executed in step (b), to simulate a far end ringing signal, in response to receipt of a call set-up acknowledgement message from a network communications device coupled to said communication circuit.

9. A method of placing a call from an integrated services digital network (ISDN) telecommunications device over a communication circuit comprising the steps of:

(a) providing said ISDN telecommunications device with a dialing mechanism that includes overlap mode ISDN dialing and enbloc mode ISDN dialing; and (b) causing said ISDN telecommunications device to place a call over said communication circuit in accordance with said dialing mechanism provided in step (a); and wherein said enbloc mode ISDN dialing of said dialing mechanism provided in step (a) is operative, when executed in step (b), to transmit an enbloc mode call set-up message containing identifications of all of the digits of a called number; and wherein said dialing mechanism provided in step (a) is further operative to store respective digits of a further called number, and is further operative, when executed in step (b), to effect overlap mode ISDN dialing of a cascaded sequence of D channel information messages identifying said respective digits of said further called number as stored in step (a).

10. A method according to claim 9, wherein said dialing mechanism provided in step (a) is further operative, when executed in step (b), to transmit a sequence of DTMF tones respectively associated with said cascaded sequence of D channel information messages identifying digits of said called number.

11. A method of placing a call from an integrated services digital network (ISDN) telecommunications device over a communication circuit comprising the steps of:

(a) providing said ISDN telecommunications device with a dialing mechanism that includes overlap mode ISDN dialing and enbloc mode ISDN dialing; and (b) causing said ISDN telecommunications device to place a call over said communication circuit in accordance with said dialing mechanism provided in step (a); and wherein said enbloc mode ISDN dialing of said dialing mechanism provided in step (a) is operative, when executed in step (b), to transmit an enbloc mode call set-up message containing identifications of all of the digits of a called number; and wherein said dialing mechanism provided in step (a) is further operative, when executed in step (b), to effect overlap mode ISDN dialing of a cascaded sequence of D channel information messages identifying said respective digits of a further called number as keyed in by a user of said telecommunications device.

12. A method according to claim 11, wherein said dialing mechanism provided in step (a) is further operative, when executed in step (b), to transmit a sequence of DTMF tones respectively associated with said cascaded sequence of D channel information messages identifying digits of said called number.

13. A method of determining whether a communication circuit is qualified for integrated services digital network (ISDN) signalling comprising the steps of:

(a) coupling a ISDN telecommunications device to said communication circuit;

(b) while said ISDN telecommunications device is ON-HOOK, causing said ISDN telecommunications device to attempt to place a call over said communication circuit using enbloc mode ISDN dialing; and (c) causing said ISDN telecommunications device to provide an indication of whether said communication circuit is qualified for ISDN signalling in accordance with whether or not a call set-up acknowledgement message is received from a network communications device coupled to said communication circuit.

14. A method according to claim 12, wherein step (c) comprises causing said ISDN telecommunications device to provide an indication that said communication circuit is qualified for ISDN signalling in response to receipt of said call set-up acknowledgement message.

15. A method according to claim 14, wherein said telecommunications device comprises an ISDN test set.

16. A method according to claim 13, wherein step (c) comprises causing said ISDN telecommunications device to provide an indication that said communication circuit is not qualified for ISDN signalling absent receipt of said call set-up acknowledgement message.

17. An integrated services digital network (ISDN) telecommunications device comprising an ISDN interface, and a supervisory control processor which is operative to cause said ISDN interface, when coupled to a communication circuit, to exchange, with a device coupled to a second location of said communication circuit, digital communication messages over an ISDN channel, and including a dialing mechanism that includes overlap mode ISDN dialing and enbloc mode ISDN dialing, and being operative to selectively place a call over said communication circuit in accordance with either of said overlap mode ISDN dialing and enbloc mode ISDN dialing of said dialing mechanisms; and wherein said dialing mechanism is operative, for an OFF-HOOK condition, to cause a call to be placed over said communication circuit using overlap mode ISDN dialing, and is further operative to cause the transmission of an overlap mode call set-up message that causes a network communications device coupled to said communication circuit to send back a call set-up acknowledgement message, and is thereafter operative to transmit a sequence of D channel information messages, each containing the identification of a respective digit of a called number.

18. An ISDN telecommunications device according to claim 17, wherein said overlap mode ISDN dialing of said dialing mechanism is further operative to generate an audible dial tone in response to said set-up acknowledgement message.

19. An ISDN telecommunications device according to claim 17, further including memory for storing respective digits of a called number and wherein said overlap mode ISDN dialing of said dialing mechanism is further operative to transmit D channel information messages identifying said respective digits of said stored called number.

20. An ISDN telecommunications device according to claim 17, wherein said overlap mode ISDN dialing of said dialing mechanism is further operative to transmit D channel information messages identifying said respective digits of a called number as keyed in by a user of said telecommunications device.

21. An ISDN telecommunications device according to claim 17, wherein said overlap mode ISDN dialing of said dialing mechanism is operative to transmit a sequence of DTMF tones respectively associated with said D channel information messages identifying digits of said called number.

22. An ISDN telecommunications device according to claim 17, further including memory for storing respective digits of a called number, and wherein said overlap mode ISDN dialing of said dialing mechanism is further operative to transmit D channel information messages identifying respective digits of a selected one of said stored called number, and another called number as keyed in by a user of said telecommunications device.

23. An ISDN telecommunications device according to claim 17, wherein said overlap mode ISDN dialing of said dialing mechanism is further operative to simulate a far end ringing signal, in response to said ISDN telecommunications device receiving a message from said network communications device indicating that it has received said D channel information messages identifying respective digits of said called number.

24. An integrated services digital network (ISDN) telecommunications device comprising an ISDN interface, and a supervisory control processor which is operative to cause said ISDN interface, when coupled to a communication circuit, to exchange, with a device coupled to a second location of said communication circuit, digital communication messages over an ISDN channel, and including a dialing mechanism that includes overlap mode ISDN dialing and enbloc mode ISDN dialing, and being operative to selectively place a call over said communication circuit in accordance with either of said overlap mode ISDN dialing and enbloc mode ISDN dialing of said dialing mechanism; and wherein said dialing mechanism is operative, for an ON-HOOK condition, to cause a call to be placed over said communication circuit using enbloc mode ISDN dialing;

said enbloc mode ISDN dialing of said dialing mechanism is operative to transmit an enbloc mode call set-up message containing identifications of all of the digits of a called number; and said enbloc mode ISDN dialing of said dialing mechanism is further operative to cause the generation of simulated far end ringing signal, in response to receipt of a call set-up acknowledgement message from a network communications device coupled to said communication circuit.

25. An integrated services digital network (ISDN) telecommunications device comprising an ISDN interface, and a supervisory control processor which is operative to cause said ISDN interface, when coupled to a communication circuit, to exchange, with a device coupled to a second location of said communication circuit, digital communication messages over an ISDN channel, and including a dialing mechanism that includes overlap mode ISDN dialing and enbloc mode ISDN dialing, and being operative to selectively place a call over said communication circuit in accordance with either of said overlap mode ISDN dialing and enbloc mode ISDN dialing of said dialing mechanism; and wherein said dialing mechanism is operative, for an ON-HOOK condition, to cause a call to be placed over said communication circuit using enbloc mode ISDN dialing;

said enbloc mode ISDN dialing of said dialing mechanism is operative to transmit an enbloc mode call set-up message containing identifications of all of the digits of a called number; and further including memory for storing respective digits of a further called number, and wherein said dialing mechanism is further operative to effect overlap mode ISDN dialing of D channel information messages identifying said respective digits of said further called number.

* * * * *

UNITED STATES PATENT AND TRADEMARK OFFICE
CERTIFICATE OF CORRECTION

PATENT NO.    : 6,256,294 B1
DATED         : July 3, 2001
INVENTOR(S)   : Paul H. Katz and Michael Kennedy It is certified that error appears in the above-identified patent and that said Letters Patent is hereby corrected as shown below:

Column 1,
Line 10, delete "now abandoned assigned" insert -- now abandoned, assigned --

Column 3,
Line 45, delete "is to employed," insert -- is to be employed, --

Column 6,
Line 50, delete "Module 70 module" insert -- Module 70 --

Column 7,
Line 27, delete "coupled to of POTS" insert -- coupled to POTS --

Column 8,
Line 3, delete "to it is connected." insert -- to which it is connected. --
Line 61, delete "digit at the time," insert -- digit at a time --

Column 14,
Line 24, delete "claim 12," insert -- claim 13, --

Signed and Sealed this

Twenty-fifth Day of March, 2003

JAMES E. ROGAN
*Director of the United States Patent and Trademark Office*